(12) United States Patent
Ogata et al.

(10) Patent No.: US 9,973,649 B2
(45) Date of Patent: May 15, 2018

(54) PHOTOGRAPHING APPARATUS, PHOTOGRAPHING SYSTEM, PHOTOGRAPHING METHOD, AND RECORDING MEDIUM RECORDING PHOTOGRAPHING CONTROL PROGRAM

(71) Applicant: Olympus Corporation, Hachioji-shi, Tokyo (JP)

(72) Inventors: Toshihiro Ogata, Hachioji (JP); Haruyuki Ishihara, Hino (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 38 days.

(21) Appl. No.: 14/657,836

(22) Filed: Mar. 13, 2015

(65) Prior Publication Data
US 2015/0189118 A1    Jul. 2, 2015

Related U.S. Application Data

(63) Continuation of application No. PCT/JP2013/076037, filed on Sep. 26, 2013.

(30) Foreign Application Priority Data

Sep. 28, 2012  (JP) ................................ 2012-217038

(51) Int. Cl.
   *H04N 5/76*   (2006.01)
   *H04N 1/32*   (2006.01)
   (Continued)

(52) U.S. Cl.
   CPC ..... *H04N 1/32106* (2013.01); *H04N 1/00095* (2013.01); *H04N 1/00204* (2013.01);
   (Continued)

(58) Field of Classification Search
   None
   See application file for complete search history.

(56) References Cited

U.S. PATENT DOCUMENTS

7,525,578 B1 *  4/2009  Barbeau ............... H04N 9/8205
                                                348/211.2
2003/0091239 A1 *  5/2003  Imagawa ........... H04N 21/2541
                                                382/232
(Continued)

FOREIGN PATENT DOCUMENTS

EP   1 311 124     5/2003
JP   2003-219383   7/2003
(Continued)

OTHER PUBLICATIONS

International Search Report to PCT/JP2013/076037 (1 pg.), with translation (2 pgs.).

*Primary Examiner* — Twyler Haskins
*Assistant Examiner* — Wesley Chiu
(74) *Attorney, Agent, or Firm* — John C. Pokotylo; Pokotylo Patent Services

(57) ABSTRACT

A photographing apparatus includes: an image pickup section that outputs a picked-up image obtained by photographing an object; a metadata creation section that creates metadata based on a tag format when the picked-up image is recorded; a communication section that can transmit the picked-up image to an external apparatus; a metadata update section that converts the metadata created by the metadata creation section into a data description language; and a transmission control section that transmits the metadata created by the metadata update section to the external apparatus via the communication section when the picked-up image is transmitted. When an image file is transmitted, auxiliary data is converted into data in text format according to a transmission destination, so that it is possible to promote effective use of the auxiliary data while enabling high-speed processing.

18 Claims, 12 Drawing Sheets

(51) Int. Cl.

| | | |
|---|---|---|
| *H04N 13/00* | (2018.01) | |
| *H04N 5/77* | (2006.01) | |
| *H04N 9/804* | (2006.01) | |
| *H04N 9/82* | (2006.01) | |
| *H04N 1/00* | (2006.01) | |
| *G03B 17/24* | (2006.01) | |

(52) U.S. Cl.
CPC ..... *H04N 1/00307* (2013.01); *H04N 1/32101* (2013.01); *H04N 5/76* (2013.01); *H04N 5/772* (2013.01); *H04N 9/8042* (2013.01); *H04N 9/8205* (2013.01); *H04N 9/8211* (2013.01); *H04N 13/0062* (2013.01); *H04N 13/0066* (2013.01); *G03B 17/24* (2013.01)

(56) References Cited

U.S. PATENT DOCUMENTS

| | | | | |
|---|---|---|---|---|
| 2006/0187309 A1* | 8/2006 | Ban | .................. | H04N 1/00204 348/211.2 |
| 2007/0229695 A1* | 10/2007 | Kato | .................. | G03B 13/02 348/333.12 |
| 2007/0261022 A1* | 11/2007 | Heuer | ................ | G06F 17/2229 717/106 |
| 2009/0263012 A1* | 10/2009 | Georgis | ............. | H04N 1/00167 382/163 |
| 2010/0066839 A1* | 3/2010 | Azuma | ................ | G11B 27/034 348/207.1 |
| 2011/0050901 A1* | 3/2011 | Oya | ........................ | H04N 7/183 348/143 |
| 2011/0261080 A1* | 10/2011 | Uchida | ............. | H04N 1/00291 345/667 |
| 2012/0176510 A1* | 7/2012 | Tysowski | ............... | G01S 19/14 348/231.3 |
| 2012/0213043 A1* | 8/2012 | Kawamura | ............ | H04N 5/85 369/30.03 |

FOREIGN PATENT DOCUMENTS

| | | |
|---|---|---|
| JP | 2005-217505 | 8/2005 |
| JP | 2011-055270 | 3/2011 |
| JP | 2011-061265 | 3/2011 |

* cited by examiner

FIG. 3
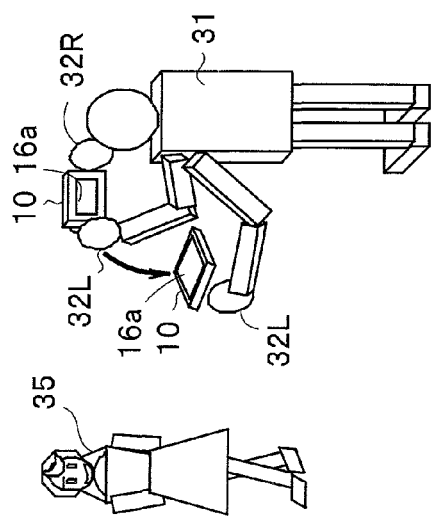
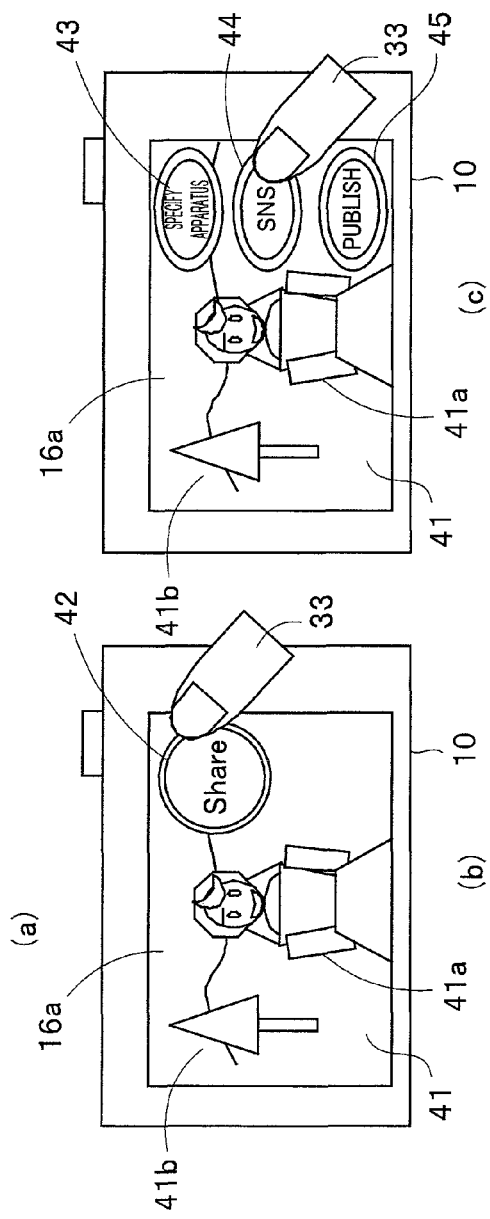

| Address | Data |
|---|---|
| 000000□△ | XXXXX |
| 000000□◇ | XXXXX |
| 000000×◇ | XXXXX |
| 000000△◇ | XXXXX |
| 000000▽× | XXXXX |

(b)

| |
|---|
| Name1/DATA1 |
| Name2/DATA2 |
| Name3/DATA3 |
| Name4/DATA4 |
| Name5/<br>Name6/DATA6 |

PHOTOGRAPHING APPARATUS, PHOTOGRAPHING SYSTEM, PHOTOGRAPHING METHOD, AND RECORDING MEDIUM RECORDING PHOTOGRAPHING CONTROL PROGRAM

CROSS REFERENCE TO RELATED APPLICATION

This application is a continuation application of PCT/JP2013/076037 filed on Sep. 26, 2013 and claims benefit of Japanese Application No. 2012-217038 filed in Japan on Sep. 28, 2012, the entire contents of which are incorporated herein by this reference.

BACKGROUND OF THE INVENTION

1. Field of the Invention

The present invention relates to a photographing apparatus, a photographing system, a photographing method, and a recording medium recording a photographing control program, which are suitable for obtaining a photographed image or the like for uploading.

2. Description of the Related Art

Recently, portable apparatuses with a photographing function (photographing apparatuses), such as digital cameras, are provided with various photographing functions utilizing image processing. Also, some of the photographing apparatuses are provided with a communication function, and can transmit an image obtained by photographing to another apparatus or a network.

Conventionally, in the photographing apparatuses, when an image is recorded, auxiliary data other than the image, such as information on a photographing date and a photographing place, is put into a file and recorded together with the image. That is, an image file is composed of image data and the auxiliary data. The image file can be edited after recording.

For example, a device has been conventionally disclosed which efficiently edits an image file recorded on a recording medium by using image data and auxiliary data remaining on a memory. As the auxiliary data, Exif (exchangeable image file format) data based on a binary format or a tag format is generally employed in order to enable high-speed processing in the photographing apparatuses.

However, some users prefer data other than the data in Exif format. Thus, the data in Exif format cannot be always effectively used in personal computers or the like. To solve the problem, Japanese Patent Application Laid-Open Publication No. 2005-217505 discloses a technique for converting the data in Exif format into data in XML (extensible markup language) format by using communication software or image management software.

SUMMARY OF THE INVENTION

A photographing apparatus according to the present invention includes: an image pickup section that outputs a picked-up image obtained by photographing an object; a metadata creation section that creates metadata based on a tag format when the picked-up image is recorded; a communication section that can transmit the picked-up image to an external apparatus; a metadata update section that converts the metadata created by the metadata creation section into a data description language; and a transmission control section that transmits the metadata created by the metadata update section to the external apparatus via the communication section when the picked-up image is transmitted.

A photographing system according to the present invention includes: a photographing apparatus including an image pickup section that outputs a picked-up image obtained by photographing an object, a metadata creation section that creates metadata based on a tag format when the picked-up image is recorded, a communication section that can transmit the picked-up image to an external apparatus, and a transmission control section that transmits the metadata created by the metadata creation section to the external apparatus via the communication section when the picked-up image is transmitted; and the external apparatus including a metadata update section that receives the metadata from the photographing apparatus, and converts the received metadata into a data description language according to a request of the photographing apparatus.

A photographing method according to the present invention includes: an image pickup step of outputting a picked-up image obtained by photographing an object; a metadata creation step of creating metadata based on a tag format when the picked-up image is recorded; a communication step of transmitting the picked-up image to an external apparatus; a metadata update step of converting the metadata created in the metadata creation step into a data description language; and a transmission control step of transmitting the metadata created in the metadata update step to the external apparatus in the communication step when the picked-up image is transmitted.

A non-transitory computer-readable recording medium recording a photographing control program according to the present invention records a photographing control program for causing a computer to execute: an image pickup step of outputting a picked-up image obtained by photographing an object; a metadata creation step of creating metadata based on a tag format when the picked-up image is recorded; a communication step of transmitting the picked-up image to an external apparatus; a metadata update step of converting the metadata created in the metadata creation step into a data description language; and a transmission control step of transmitting the metadata created in the metadata update step to the external apparatus in the communication step when the picked-up image is transmitted.

BRIEF DESCRIPTION OF THE DRAWINGS

FIG. 3 is an explanatory view for explaining an operation of the embodiment;

FIG. 4 is an explanatory view for explaining conversion of metadata;

DETAILED DESCRIPTION OF THE PREFERRED EMBODIMENTS

In the following, embodiments of the present invention will be described in detail by reference to the drawings.

First Embodiment

Figure 1:
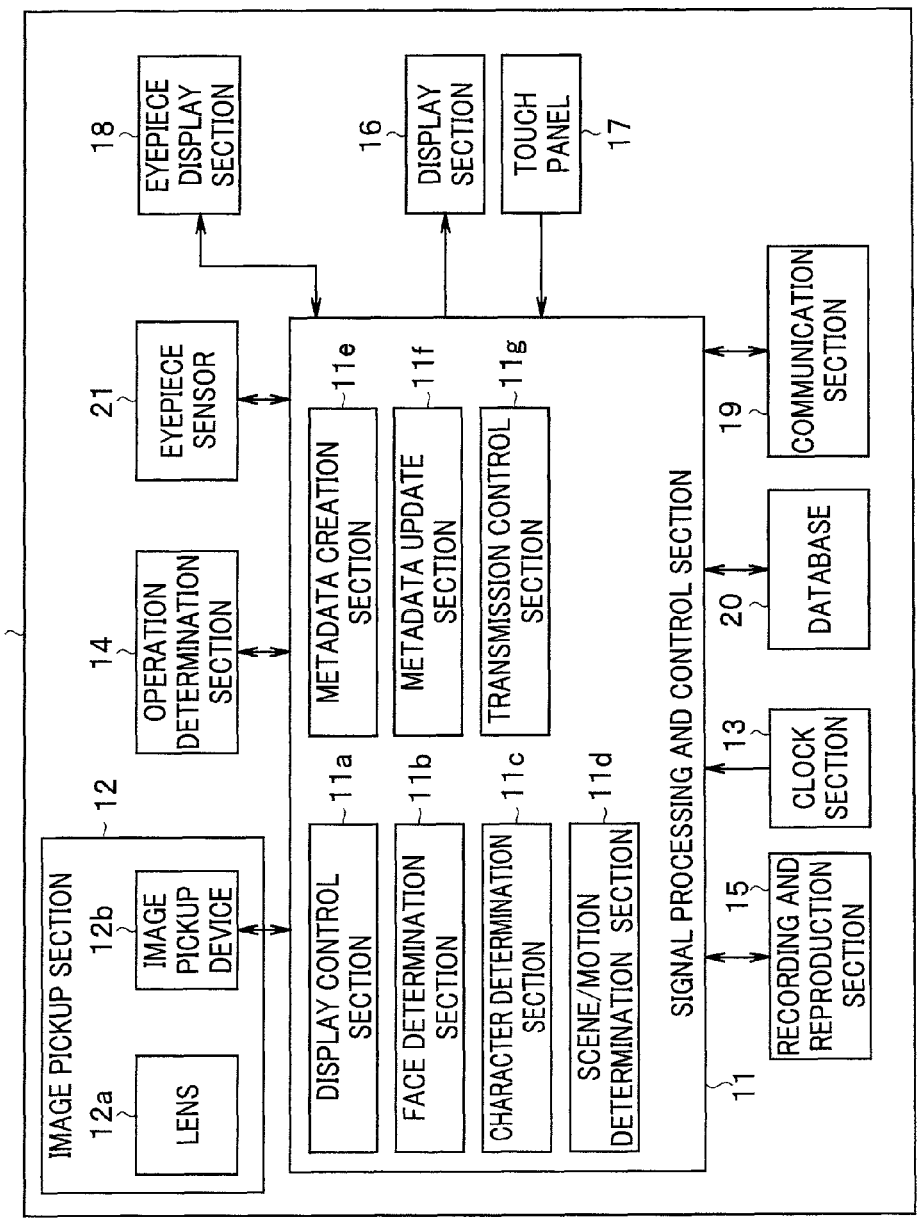
FIG. 1 is a block diagram illustrating a circuit configuration of a photographing apparatus according to a first embodiment of the present invention.

FIG. 1 is a block diagram illustrating a circuit configuration of a photographing apparatus according to a first embodiment of the present invention. In the present embodiment, metadata recording in binary format or tag format such as Exif format is performed when an image is recorded. Here, an image file based on a single picked-up image is composed of image data and metadata of the picked-up image.

Figure 2:
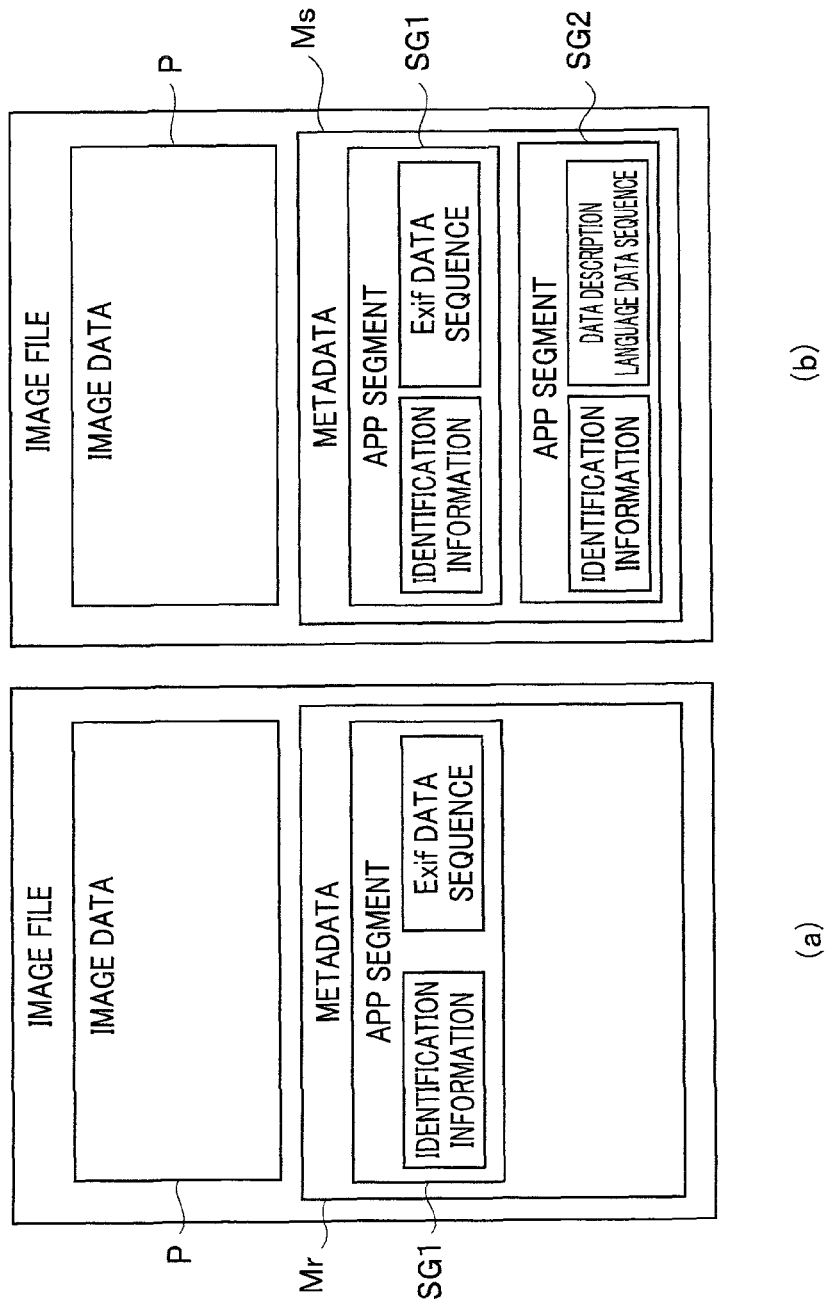
FIG. 2 is an explanatory view for explaining a format of an image file employed in the present embodiment.

FIG. 2 is an explanatory view for explaining a format of an image file employed in the present embodiment. FIG. 2(a) shows an image format at the time of recording. The image file is composed of image data P and auxiliary data (metadata) Mr. The metadata is data other than contents (here, an image), and is used for enabling a user or an application to more efficiently handle the contents. For example, the metadata may include information on a size of the image, and property information such as a creator and a creation date.

In an example in FIG. 2(a), the metadata Mr has a single APP segment SG1, which includes identification information of a data sequence, and the data sequence. Data in binary format is employed as the data sequence, and information indicating that the data sequence is the data in binary format is described in the identification information.

The data sequence in binary format includes a standard data sequence and a maker note. The standard data sequence includes standardized information such as photographing information, e.g., information on an exposure time, a diaphragm value, an exposure program, ISO sensitivity, and a photographing date. The maker note can include various pieces of information not included in the standard data sequence. For example, information on a feature value of a face of a photographed person, a face recognition result, and optional information such as a name obtained by the face recognition result can be described in the maker note.

In the present embodiment, the data in binary format is converted into a language that is easily used by many apparatuses or users, and is then transmitted when the image file is transmitted. For example, the data sequence in binary format is changed into a data description language (a text description language) that is a language exhibiting an advantage especially when various pieces of data are handled on the Internet. For example, in the present embodiment, data in XMP format described in text, e.g., data in XML format, is employed as the data description language.

FIG. 2(b) shows an image format at the time of image communication as described above. The image file is composed of the image data P and metadata Ms. The metadata Ms has two APP segments SG1 and SG2. The APP segment SG1 has same contents as those of the APP segment SG1 at the time of recording. In the present embodiment, the APP segment SG2 includes a data description language data sequence obtained by changing information of the data sequence of the APP segment SG1 into the data description language. Identification information of the data sequence includes information indicating that the data description language data sequence is described in the data description language.

Due to limitations on a processing speed, it is not always possible to surely build all the maker notes at the time of photographing. For example, there may be a case in which the face recognition result or the like to be recorded as the maker note cannot be acquired at the time of photographing. In this case, such data may be additionally described in the data description language when the image file is transmitted. Note that information added when the image file is transmitted may be inserted into the data sequence in binary format, or the data sequence in binary format may be deleted after creating the data description language.

In FIG. 1, a photographing apparatus 10 has an image pickup section 12 that is composed of an image pickup device such as a CCD and a CMOS sensor. The image pickup section 12 is composed of a lens 12a that is provided on a front surface of the photographing apparatus 10 to capture an object image, and an image pickup device 12b that photoelectrically converts the object image from the lens 12a to obtain a photographed image signal.

The image pickup section 12 is drive-controlled by a signal processing and control section 11 to photograph an object via the lens 12a, and output a photographed image. The signal processing and control section 11 outputs a drive signal for the image pickup device 12b to the image pickup section 12, and reads out the photographed image from the image pickup section 12. The signal processing and control section 11 performs predetermined signal processing, such as color adjustment processing, matrix conversion processing, noise removal processing, and other various types of signal processing, on the read-out photographed image.

A clock section 13 and an operation determination section 14 are also disposed in the photographing apparatus 10. The clock section 13 produces time information used by the signal processing and control section 11. The operation determination section 14 produces an operation signal based on a user operation on an operation section that is provided in the photographing apparatus 10 and includes a release button, a function button, and various switches for setting a photographing mode or the like (not shown), and outputs the operation signal to the signal processing and control section 11. The signal processing and control section 11 controls respective sections based on the operation signal.

A display control section 11a of the signal processing and control section 11 executes various types of processing regarding display. The display control section 11a can give the photographed image obtained after the signal processing to a display section 16 and an eyepiece display section 18. Each of the display section 16 and the eyepiece display section 18 has a display screen such as an LCD, and displays the image given from the display control section 11a. The display control section 11a can also display various menu displays or the like on the display screens.

A touch panel 17 is also provided in the photographing apparatus 10. For example, by providing the touch panel 17 on the display screen of the display section 16, an operation signal according to a position on the display screen indicated by a user with his/her finger can be produced. Accordingly, users can easily perform a selection operation or the like on an image displayed on the display screen of the display section 16.

Note that the display section 16 is disposed so as to occupy a substantially entire area of, for example, a back surface of the photographing apparatus 10 (see FIG. 3), so that a photographer can check a through-the-lens image displayed on the display screen of the display section 16 at the time of photographing, and can perform a photographing operation while checking the through-the-lens image.

An eyepiece sensor 21 is also provided in the photographing apparatus 10. For example, the eyepiece sensor 21 is composed of a retina sensor, and can recognize a retina of a photographer. Note that the eyepiece sensor 21 may be a sensor that recognizes a photographer by image recognition of the photographer.

The signal processing and control section 11 can compress the photographed image obtained after the signal processing, give the compressed image to a recording and reproduction section 15, and cause the recording and reproduction section 15 to record the image. For example, a card interface can be employed as the recording and reproduction section 15. The recording and reproduction section 15 can record image information, audio information or the like on a recording medium such as a memory card, and can also read out and reproduce the image and the audio information recorded on the recording medium.

The signal processing and control section 11 controls the respective sections to set a photographing mode based on a user operation, and achieve a photographing function according to each photographing mode. For example, when an operation signal for instructing an image file transmission mode (a network sharing mode) is inputted from the operation determination section 14 or the like, the signal processing and control section 11 can set the transmission mode.

A metadata creation section 11e of the signal processing and control section 11 creates metadata when a picked-up image from the image pickup section 12 is photographed. When the picked-up image is photographed, the metadata creation section 11e creates the metadata Mr in binary format as shown in FIG. 2(a) When the picked-up image is recorded, the signal processing and control section 11 creates the image file composed of the image data P and the metadata Mr, gives the image file to the recording and reproduction section 15, and causes the recording and reproduction section 15 to record the image file.

A communication section 19 is provided in the photographing apparatus 10. The communication section 19 is controlled by a transmission control section 11g to transmit and receive information by performing communication with an external apparatus (not shown). Note that various transmission lines can be employed as the communication section 19. For example, a wired transmission line employing a cable such as a LAN, and a wireless transmission line employing a wireless LAN, Bluetooth (registered trademark), WiMAX, a telephone network or the like can be used.

In the present embodiment, when the transmission mode is specified in which the communication with an external apparatus is performed by using the communication section 19, the transmission control section 11g of the signal processing and control section 11 controls a metadata update section 11f to read out the metadata Mr included in a specified image file from the recording and reproduction section 15, and generate the new metadata Ms obtained by converting the data in binary format into the data description language. The transmission control section 11g gives the changed metadata to the recording and reproduction section 15 to update the image file, and gives the image file including the metadata converted into the data description language to the communication section 19 to transmit the image file to a predetermined transmission destination. Note that, in this case, the communication section 19 may transmit only the APP segment SG2 described in the data description language, or both of the APP segment SG1 in binary format and the APP segment SG2 in the data description language as the metadata.

Moreover, the transmission control section 11g may control the metadata update section 11f to generate information that is not described in the metadata Mr in binary format, and additionally record the information in the metadata Ms described in the data description language. The transmission control section 11g can also transmit the image file including the newly-created metadata Ms.

To create the new metadata at the time of transmission, the signal processing and control section 11 is provided with a face determination section 11b, a character determination section 11c, and a scene/motion determination section 11d. The face determination section 11b detects a face of a person in the photographed image by a known face detection method. For example, the face determination section 11b may employ a method for detecting a face of a person by sequentially comparing the photographed image with a plurality of grayscale images in which features of face brightness are modeled. The face determination section 11b can also determine an expression on a face by using a database (not shown) that stores features of an angle of a mouth, an angle of outer corners of eyes, and a shadow of face parts, for example, in a case of a smile. The face determination section 11b can also determine an age, a sex, or the like of a photographed person by using a database (not shown) that stores feature values of faces of a plurality of people. Moreover, the face determination section 11b can determine a name of a photographed person by storing a feature value of a face and a name inputted by a user in association with each other.

The character determination section 11c extracts characters from the picked-up image by character recognition processing on characters in the picked-up image. The scene/motion determination section 11d detects a scene, a motion of a body in the picked-up image, or the like from the picked-up image. Moreover, the signal processing and control section 11 may determine a color and a shape in the picked-up image. Note that the motion of a body needs to be acquired from the through-the-lens image, and information based on the motion of a body is recorded in the maker note or the like at the time of photographing.

The metadata update section 11f generates metadata according to results of the determination by using the data description language, and updates the image file. For example, when the face determination section 11b determines a name of a person in the picked-up image based on a feature value of a face, the metadata update section 11f describes the name of the person existing in the picked-up image as the metadata. For example, when a title of a picked-up compact disk (CD) is detected by the character determination section 11c, the metadata update section 11f may generate a text describing "Schubert's CD" or the like as the metadata. The metadata update section 11f can also generate a text describing "scenery in green", "a red sunset" or the like as the metadata based on a determination result on a color and a shape in the picked-up image. The metadata update section 11f may also generate text information of a photographer as the metadata based on a detection result of the eyepiece sensor 21.

Note that the metadata creation section 11e may generate metadata in binary format based on the determination results of the determination sections 11b to 11d at the time of image pickup or before the image file is transmitted if no problem is caused in processing capacity. In this case, the metadata update section 11*f* changes the created metadata into the data description language and updates the metadata when the file is transmitted.

Moreover, in addition to simply changing the metadata in binary format into the data description language, the metadata update section 11*f* may also generate new metadata by the data description language by using the metadata in binary format and the determination results determined from the image by the respective determination sections 11*b* to 11*d*. For example, the metadata update section 11*f* may generate a text describing "Summer Shinshu", "New Year's Day in Japan" or the like by using a photographing data and latitude/longitude information in the metadata in binary format. In order to facilitate conversion into a text from the color and the shape in the image as described above, or conversion into a text from the metadata such as a date, the photographing apparatus 10 is provided with a database 20. The database 20 has a dictionary function to effect the conversion into a text by use of information such as a numerical value, and a shape and a color in an image. By using the database 20, richer and easier-to-handle information can be provided to users based on information such as a color, a shape, a position, and a date included in the image data or the metadata.

The process of updating various pieces of metadata described above by the metadata update section 11*f* can be also easily achieved by referring to the database 20 in which, for example, a relationship between the data in binary format and a text, and a relationship between various determination results and a text are described. The present embodiment is described on an assumption that the metadata update section 11*f* updates the metadata by employing the database 20 in which a relationship between original data for the metadata to be converted into a text and a text is described.

Although the example in which the metadata is set for each image file has been described, auxiliary data for managing image files is recorded separately from the image files in some cases. For example, there is auxiliary data in which a name of a person included in an image of each image file or which group the image file belongs to is described. In the present embodiment, the auxiliary data as described above can be also converted into the data description language, and transmitted. The metadata is assumed to include the auxiliary data as described above for the purpose of simplifying the following description.

By the way, there may be a case in which a user uploads a photographed image obtained by photographing to a network such as the Internet, and shares the image with a third party for fun. However, it is not preferable to publish some metadata of the photographed image in view of privacy.

Thus, in the present embodiment, the transmission control section 11*g* configures different security settings for transmitting the metadata according to a type of a transmission destination. For example, the transmission control section 11*g* classifies apparatuses as the transmission destination into three types: a particular apparatus, an apparatus in a limited network, and an apparatus in an open network, and determines contents to be transmitted for each type. For example, the transmission control section 11*g* directly transmits all the metadata to the particular apparatus, transmits the metadata from which part of the data is removed to the apparatus in a limited network, and transmits only part of the metadata to the apparatus in an open network. The transmission control section 11*g* may also transmit the metadata after processing the metadata according to the type of the transmission destination.

Next, an operation of the embodiment having the above configuration will be described by reference to FIGS. 3 to 9. FIG. 3 is an explanatory view for explaining the operation of the embodiment. FIG. 4 is an explanatory view for explaining the conversion of the metadata. FIGS. 5 to 9 are flowcharts for explaining the operation of the embodiment.

Figure 5:
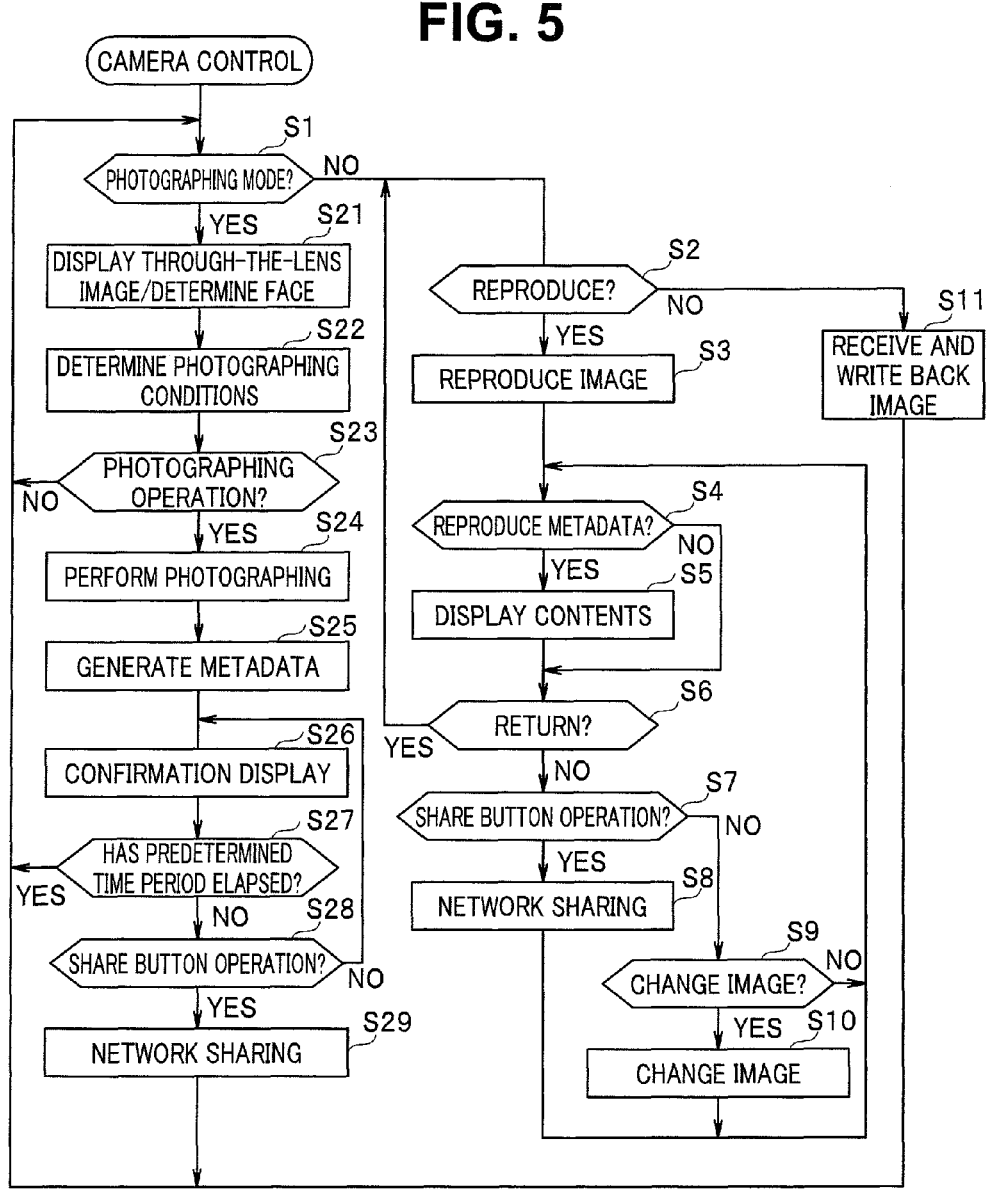
FIG. 5 is a flowchart for explaining the operation of the first embodiment.

FIG. 5 shows camera control. In step S1 in FIG. 5, the signal processing and control section 11 determines whether or not the photographing apparatus 10 is in the photographing mode. Here, it is assumed that the photographing mode is instructed. In this case, the signal processing and control section 11 displays a through-the-lens image and performs face determination in step S21. The signal processing and control section 11 captures a photographed image from the image pickup section 12, and performs predetermined signal processing thereon. The signal processing and control section 11 outputs the photographed image obtained after the signal processing to the face determination section 11*b*. The signal processing and control section 11 also gives the photographed image obtained after the signal processing to the display section 16 and causes the display section 16 to display the through-the-lens image.

The signal processing and control section 11 also determines various photographing conditions in step S22. For example, the signal processing and control section 11 determines information such as an exposure time, a diaphragm value, an exposure program, ISO sensitivity, and a photographing date used for creating metadata.

The signal processing and control section 11 determines whether or not a photographing operation is performed in step S23. Here, it is assumed that a photographer operates the release button or the like to perform photographing. The signal processing and control section 11 then proceeds to next step S24, and performs photographing.

FIG. 3(*a*) shows a state in which the photographing operation is performed. A photographer 31 holds the photographing apparatus 10 toward an object 35. For example, as shown in FIG. 3(*a*), the photographer 31 grasps the photographing apparatus 10 with a right hand 32R and a left hand 32L, and performs photographing while viewing the through-the-lens image displayed on a display screen 16*a* of the display section 16.

A picked-up image from the image pickup section 12 is supplied to the signal processing and control section 11, and predetermined signal processing is performed thereon. The metadata creation section 11*e* creates the metadata SG1 based on a face determination result, a determination result on the photographing conditions, or the like (step S25). As described above, metadata in binary format is created at the time of photographing. Note that the metadata creation section 11*e* also creates a maker note for increasing an information volume of a distance and a color of the object or the like as processable as possible as well as a standard data sequence in binary format. The signal processing and control section 11 records an image file composed of image data and the metadata.

The signal processing and control section 11 gives the recorded photographed image to the display section 16, to effect rec-view display (confirmation display) in step S26. The photographer 31 checks the rec-view display, and horizontally holds the photographing apparatus 10 such that the touch panel 17 disposed on the display screen 16*a* is easily operated by the hand as indicated by a downward arrow in FIG. 3(*a*).

The signal processing and control section 11 determines whether or not a predetermined time period has elapsed from the rec-view display in step S27, and deter mines whether or not a share button operation for proceeding to the network sharing mode is performed in step S28.

FIG. 3(*b*) shows a rec-view image 41 displayed on the display screen 16*a*. In an example in FIG. 3(*b*), an operation icon 42 is displayed as a share button by the display control section 11*a*, As shown in FIG. 3(*b*), the rec-view image 41 includes an image 41*a* of a person and an image 41*b* of a tree and mountain background. The operation icon 42 is displayed at an end portion on the display screen 16*a*.

Note that the signal processing and control section 11 may automatically display the operation icon 42 that is the share button every time photographing is performed, or display the operation icon by detecting that a user horizontally inclines the photographing apparatus 10 after photographing by an acceleration sensor or the like (not shown) provided in the photographing apparatus 10.

Here, it is assumed that the user performs a touch operation of the operation icon 42 by a finger 33 or the like. Accordingly, the signal processing and control section 11 sets the network sharing mode (step S29). In the network sharing mode, the display control section 11*a* displays selection icons 43 to 45 for determining the type of the transmission destination. The selection icon 43 is for specifying the particular apparatus as the type of the transmission destination. The selection icon 44 is for specifying the apparatus in a limited network as the type of the transmission destination. The selection icon 45 is for specifying the apparatus in an open network as the type of the transmission destination.

Figure 6:
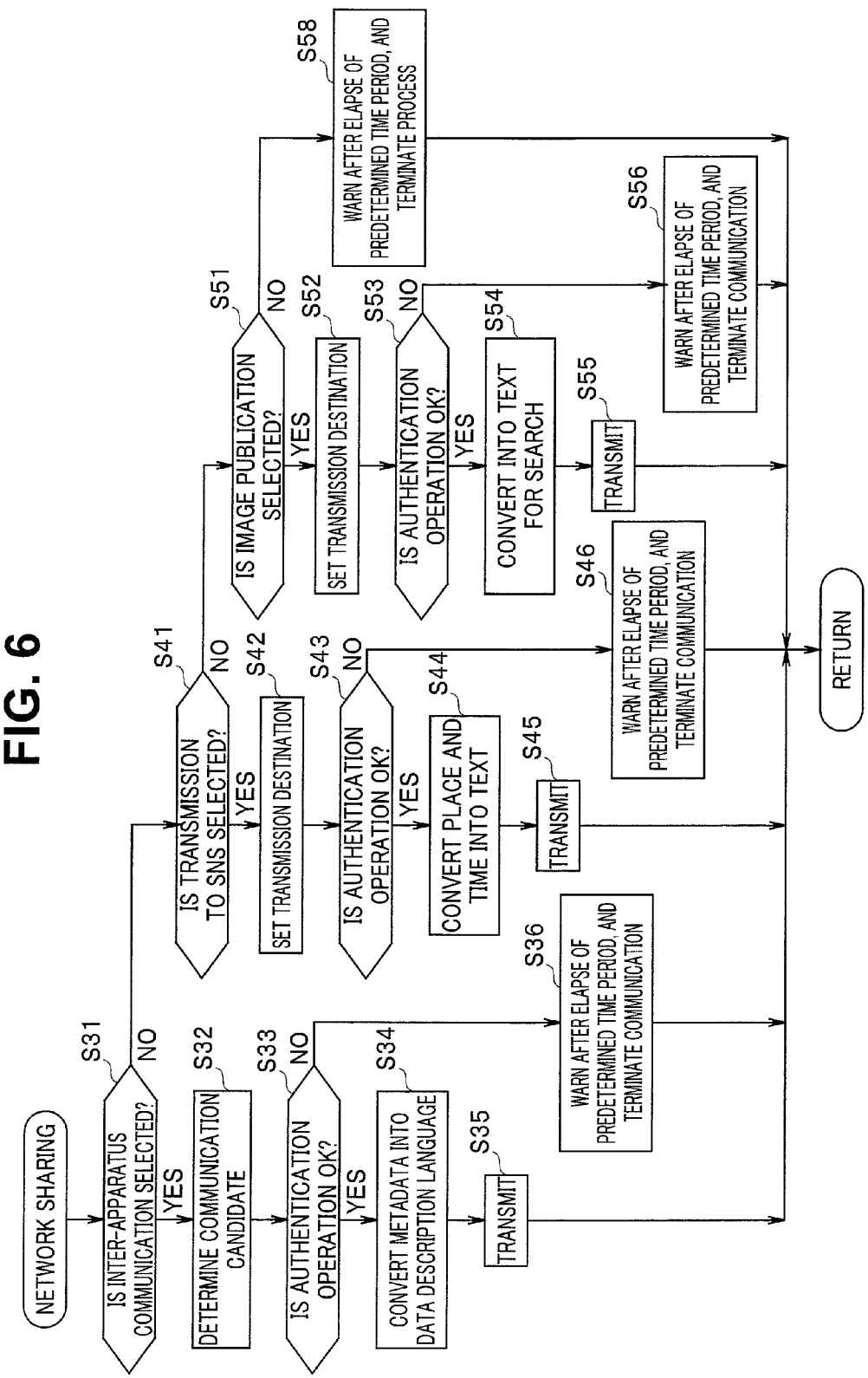
FIG. 6 is a flowchart for explaining the operation of the first embodiment.

FIG. 6 shows a specific flow of a network sharing process in steps S29 and S8 in FIG. 5.

In the network sharing process, the photographing apparatus 10 automatically transmits the image file to outside via the communication section 19, for example, according to the flow in FIG. 6. The transmission control section 11*g* determines whether or not inter-apparatus communication is selected in step S31 in FIG. 6. When the inter-apparatus communication is selected, the transmission control section 11*g* determines a communication candidate in next step S32, and performs an authentication operation in step S33. When authentication is performed between the communication section 19 and an apparatus as the communication candidate, the transmission control section 11*g* converts the metadata into the data description language in step S34, and transmits the image file to the destination apparatus (step S35).

Figure 7:
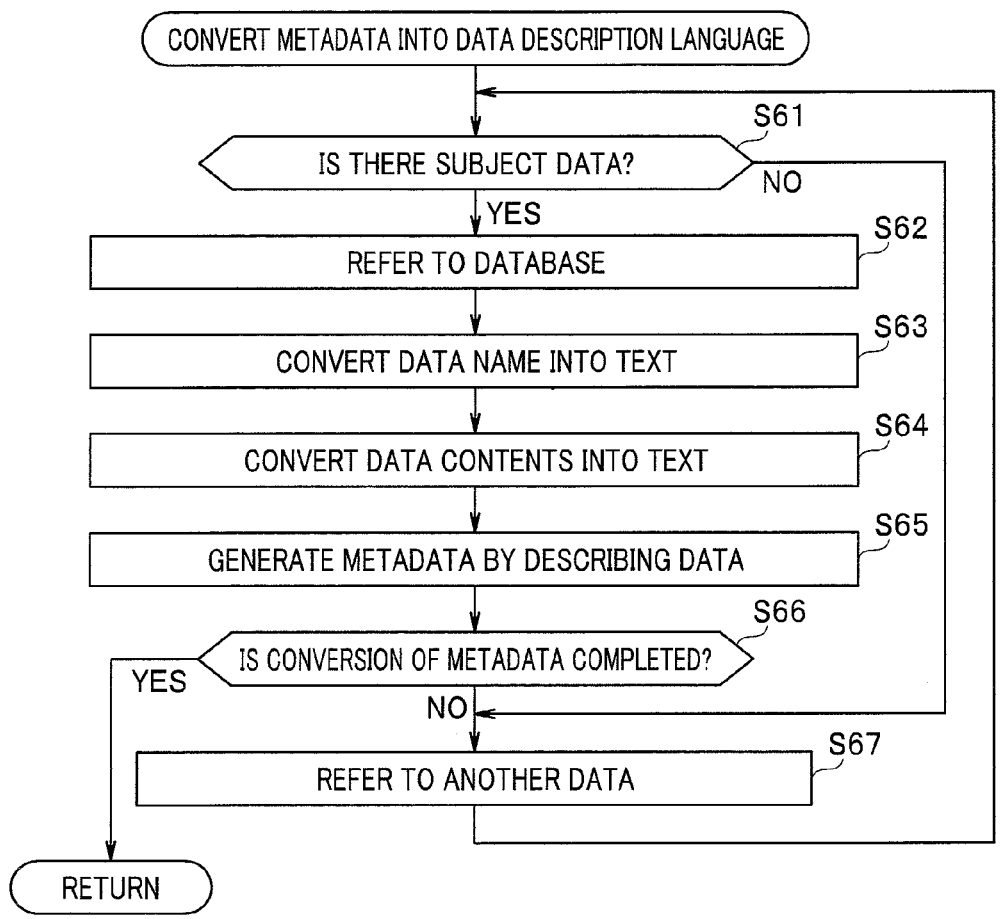
FIG. 7 is a flowchart for explaining the operation of the first embodiment.

FIG. 7 is a flowchart illustrating a specific example of a process in step S34 in FIG. 6.

FIG. 4(*a*) shows recorded contents of the metadata before being transmitted. In FIG. 4(*a*), Address indicates a recording position on the recording medium of the metadata in the image file that is recorded in the recording and reproduction section 15, and Data indicates recorded contents at the recording position defined by the Address.

In the present embodiment, the recording position of the metadata on the recording medium is defined according to an item to be described in the binary format. In the database 20, a relationship between the recording position of the metadata on the recording medium and the item to be described is described. When there exists an item (subject data) that can be converted into the data description language, the process proceeds to step S62 from step S61, and the metadata update section 11*f* refers to the database 20.

The metadata update section 11*f* refers to the database 20, to convert the Address in the metadata into an item name (a data name) in text format (step S63). The metadata update section 11*f* also refers to the database 20, to convert the Data in the metadata into data contents in text format (step S64). The metadata update section 11*f* generates metadata based on the item names and the data contents converted into a text. The APP segment SG2 in FIG. 2(*b*) is thereby generated (step S65).

FIG. 4(*b*) shows the metadata converted into a text. In the metadata, the item names and the Data corresponding to the respective item names are described in text. In an example in FIG. 4(*b*), the respective addresses in FIG. 4(*a*) are converted into item names Name 1, Name 2, and so on, and the respective binary Data in FIG. 4(*a*) are converted into DATA 1, DATA 2 and so on described in text. Note that the metadata may have a hierarchical structure, and for example, an item name Name 5 has an item name Name 6 in a lower hierarchical level.

When the conversion of the metadata has not been completed (step S66), the metadata update section 11*f* refers to a next item (another data), and repeats the process in steps S61 to S66. When the conversion of all the metadata is completed, the process returns to step S35 in FIG. 6. The transmission control section 11*g* controls the communication section 19 to transmit the image file.

Accordingly, in the particular device to which the image file is transferred, the received image file can be displayed, edited, searched or the like. In this case, since the received metadata is converted into the data description language, the metadata can be used by a wide variety of software. For example, other apparatuses, such as a personal computer and a smartphone, owned by an owner of the photographing apparatus 10 are considered as the particular apparatus. When the owner uses the image file from the photographing apparatus 10 in another apparatus, the owner can easily perform search, editing, or the like by using the metadata converted into the text language.

Since the metadata is described in the data description language in XML format or the like as described above, it is possible to easily manage the data by giving a name or a parameter thereto. The data can be sorted or the like with a higher degree of freedom, and can be also hierarchically represented. Accordingly, the following advantages are provided. That is, the data can be easily used by everyone, is compatible with computers, the Internet, and home information appliances, and can be used by a browser. Also, the data is easily handled from a program, and has high development efficiency in view of service improvement.

Next, for example, it is assumed that the user performs a touch operation of the selection icon 44 in FIG. 3(*c*), that is, performs an operation of specifying the apparatus in a limited network as the destination. When detecting the operation in step S41 in FIG. 6, the transmission control section 11*g* sets the transmission destination in step S42. For example, the transmission control section 11*g* sets a preregistered SNS (social networking service) as the transmission destination, and performs an authentication operation (step S43).

Even though the SNS is limited, a relatively large number of users can share images. Thus, in some cases, it may be not preferable to directly upload the image file composed of the image data and the metadata for image sharing in view of personal information protection or the like. Thus, in the present embodiment, contents permitted to be transmitted are switched for each destination type in the network sharing mode.

When authentication is performed, the transmission control section 11*g* converts a place and a time into a text in step S44 in FIG. 6, and transmits the image file (step S45). That is, in this case, the metadata update section 11*f* is controlled by the transmission control section 11g to convert only items regarding the place and the time out of various items in the metadata into the data description language.

Figure 8:
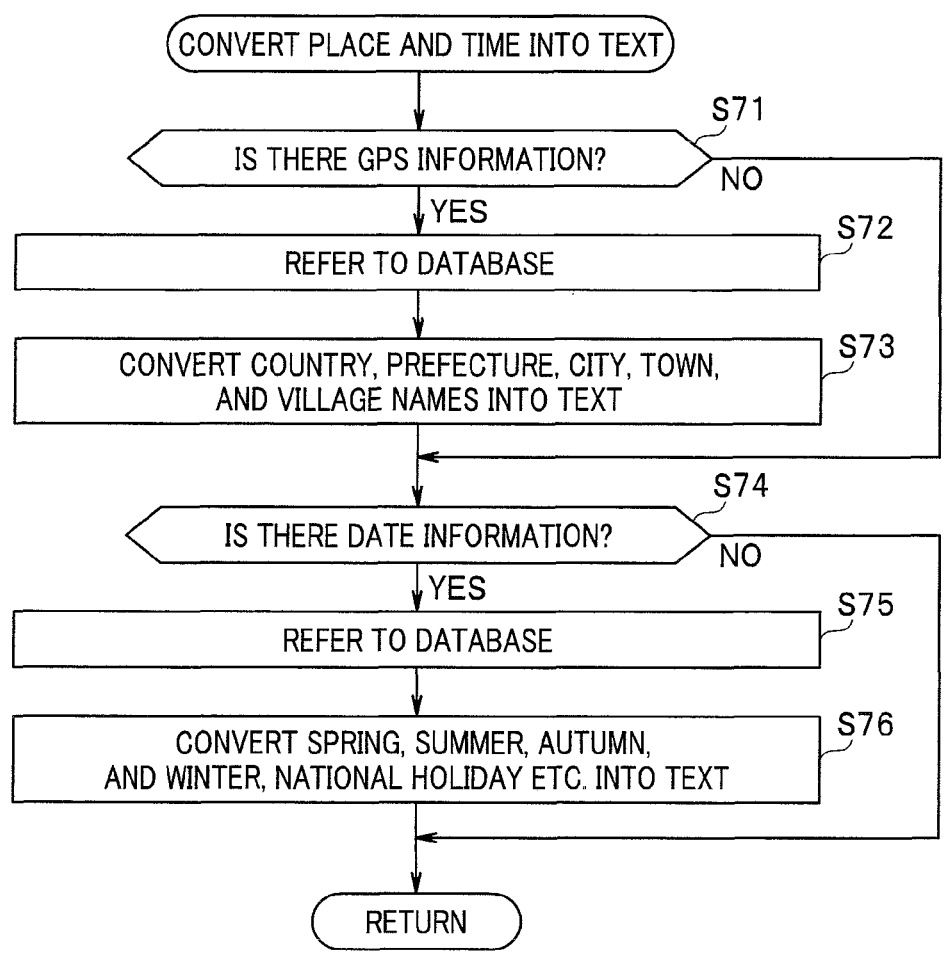
FIG. 8 is a flowchart for explaining the operation of the first embodiment.

FIG. 8 is a flowchart illustrating a specific example of a process in step S44 in FIG. 6. In the database 20, a text corresponding to GPS information, and a text corresponding to date information are described. When the GPS information exists (step S71), the metadata update section 11f is controlled by the transmission control section 11g to refer to the database 20 in step S72. The metadata update section 11f converts the GPS information into a text such as country, prefecture, city, town, and village names, or a local region name based on a description in the database 20 (step S73). Note that the metadata update section 11f may simply convert latitude/longitude based on the GPS information into a text.

When the date information exists (step S74), the metadata update section 11f is also controlled by the transmission control section 11g to refer to the database 20 in step S75. The metadata update section 11f converts the date information into a text such as a season such as spring, summer, autumn, and winter, Christmas day, New Year's Day, and a national holiday based on a description in the database. Moreover, the metadata update section 11f may convert information on a birthday in the picked-up image into a text from the date information. The metadata update section 11f may also simply convert a date based on the date information into a text.

Note that texts in languages of a plurality of countries may be described in the database 20 to which the metadata update section 11f refers. Accordingly, the metadata update section 11f can make conversion into texts in languages of respective countries, and can also make conversion into a text in a language specified by a user.

When the conversion of the metadata is completed, the process returns to step S45 in FIG. 6. The transmission control section 11g controls the communication section 19 to transmit the image file. Note that, in this case, the transmission control section 11g transmits only the data updated by the metadata update section 11f as the metadata. Accordingly, when the user selects the SNS, for example, information regarding only a region and a date is transmitted as the metadata. When the SNS is selected, it is considered that the image is shared by an apparatus of a friend or the like. Thus, metadata such as a photographing place and a photographing date of, for example, a photograph shot in a trip with a friend is converted into the data description language, so that use of the data can be facilitated. On the other hand, personal information or the like can be protected by not transmitting the other data.

Next, for example, it is assumed that the user performs a touch operation of the selection icon 45 in FIG. 3(c), that is, performs an operation of specifying the apparatus in an open network as the destination. When detecting the operation in step S51 in FIG. 6, the transmission control section 11g sets the transmission destination in step S52. For example, the transmission control section 11g sets a preregistered blog or a preregistered image posting website as the transmission destination, and performs an authentication operation (step S53). Note that a warning is issued after an elapse of a predetermined time period, and the process is terminated (step S58) when the operation of selecting image publication is not detected in step S51.

In the image posting website or the like, unspecified many users can share images. Thus, in the present embodiment, an image file composed of the image data and metadata for search is uploaded. For example, a user who is not acquainted with the photographer tends to search images based on a photographing subject, a photographing place, a season, or the like.

When authentication is performed, the transmission control section 11g converts data for search into a text as the metadata in step S54 in FIG. 6, and transmits the image file (step S55). That is, in this case, the metadata update section 11f is controlled by the transmission control section 11g to convert only items suitable for search out of various items in the metadata into the data description language. The metadata update section 11f thereby improves user friendliness for a user who uses the published image while reducing a transmitted data volume, and also enables protection of personal information. Note that although items regarding information on so-called 5W1H are considered as the items suitable for search, it is better not to transmit information regarding "who" in consideration of a point that the image is published.

Figure 9:
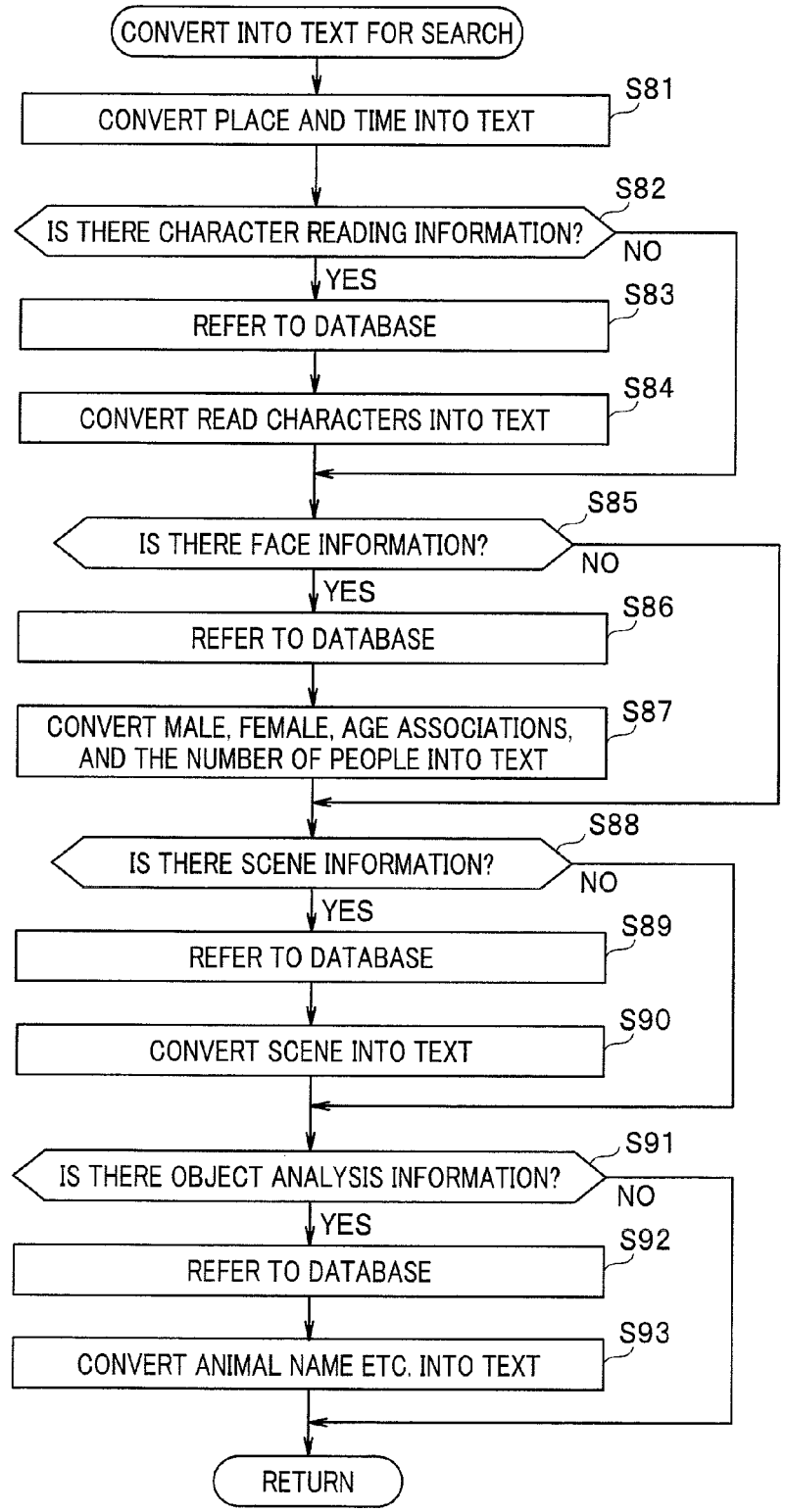
FIG. 9 is a flowchart for explaining the operation of the first embodiment.

FIG. 9 is a flowchart illustrating a specific example of a process in step S54 in FIG. 6. In the database 20, a text corresponding to character reading information, a text corresponding to face information, a text corresponding to scene information, and a text corresponding to object analysis information are described. The metadata update section 11f is controlled by the transmission control section 11g to convert a place and a time into a text in a similar manner to, for example, that in FIG. 8 (step S81).

Note that the place and the time are converted into a text in consideration of security of personal information in step S81. For example, a country name or a prefecture name is converted into a text based on GPS information in order to prevent individuals from being identified. When information on a personal birthday is included as date information, the date information is not converted into a text.

When the character reading information exists (step S82), the metadata update section 11f refers to the database 20 (step S83), to convert read characters into a text (step S84). For example, a station name included in the image is converted into a text, so that the data can be easily used in map search or the like.

When the face information exists (step S85), the metadata update section 11f refers to the database 20 (step S86), to make conversion into a text based on the face information (step S87). For example, a sex and an age of a person, and the number of people included in the image are converted into a text. For example, when it is detected that a baby exists in the picked-up image based on a feature value of a face, a text "baby" is described in the metadata.

When the scene information exists (step S88), the metadata update section 11f refers to the database 20 (step S89), to make conversion into a text based on the scene information (step S90). For example, information indicating that the image shows a scene of a sunset, or a scene of mountains is converted into a text. Moreover, the metadata update section 11f may detect respective scenes by using information such as a shape, a position, a color, and GPS. By converting the scenes into a text, image search corresponding to respective scenes in the image posting website or the like can be facilitated.

When the object analysis information exists (step S91), the metadata update section 11f refers to the database 20 (step S92), to make conversion into a text based on the object analysis information (step S93). For example, when it is detected that the object is a pet, an animal, or a bird, the information is converted into a text. Accordingly, by using an animal name or the like as a keyword, image search in the image posting website or the like can be facilitated.

Note that the network sharing mode is set not only at the time of photographing but also at the time of reproduction. When the photographing mode is not specified in step S1 in FIG. 5, the signal processing and control section 11 determines whether or not a reproduction mode is instructed in step S2. When the reproduction mode is instructed, the signal processing and control section 11 reads out an image recorded in the recording and reproduction section 15, and performs predetermined signal processing such as decompression processing. The signal processing and control section 11 then gives the image to the display section 16, and causes the display section 16 to reproduce and display the image (step S3).

The signal processing and control section 11 determines whether or not it is instructed to reproduce metadata in step S4. When it is instructed to reproduce metadata, the signal processing and control section 11 displays contents of the metadata on the display section 16 (step S5). The signal processing and control section 11 determines whether or not an operation of returning the reproduction mode to an original state is performed in step S6. When the operation is performed, the process is returned to step S2. When the operation of returning the reproduction mode to an original state is not performed, the display control section 11a displays the operation icon 42 on the display screen 16a as the share button. In step S7, it is determined whether or not a share button operation is produced.

When the share button operation is not performed, the signal processing and control section 11 determines whether or not a change operation of specifying another image is performed (step S9). When the change operation is performed, the signal processing and control section 11 reads out the other specified image, and performs predetermined signal processing such as decompression processing. The signal processing and control section 11 then gives the image to the display section 16, and causes the display section 16 to reproduce and display the image (step S10).

When determining that the share button operation is performed, the signal processing and control section 11 proceeds to the network sharing mode in step S8. An operation in the network sharing mode is similar to that in step S29. Also, when determining that the reproduction mode is not instructed in step S2, the signal processing and control section 11 performs an image receiving and writing-back process in step S11.

As described above, in the present embodiment, when the recorded binary metadata is transmitted, the recorded binary metadata is converted into the data description language and transmitted. At the time of recording, the binary data is employed. Thus, it is easy to process the metadata in the photographing apparatus. On the other hand, at the time of transmission, the metadata is converted into the data description language having excellent versatility, and transmitted. Thus, use of the transmitted image file is facilitated. Also, the metal data to be transmitted is changed depending on the transmission destination, so that excellent security is achieved. Although text search is not popular in general cameras, text search is mainly employed in computers, and a description in XML format is often used in the Internet or the like. Therefore, it is possible to suppress a decrease in processing speed by recording the metadata in binary format at the time of recording, and it is also possible to facilitate the use of the image file on the Internet and in computers etc. by describing the metadata in the data description language such as XML and transmitting the metadata at the time of transmission. For example, search becomes extremely easy, and it is also possible to easily check contents to be processed in image editing.

Note that although the example in which the metadata in binary format is changed into the data description language and recorded at the time of transmission has been described, the metadata may be changed into the data description language at any timing after photographing and before transmission.

Second Embodiment

Figure 10:
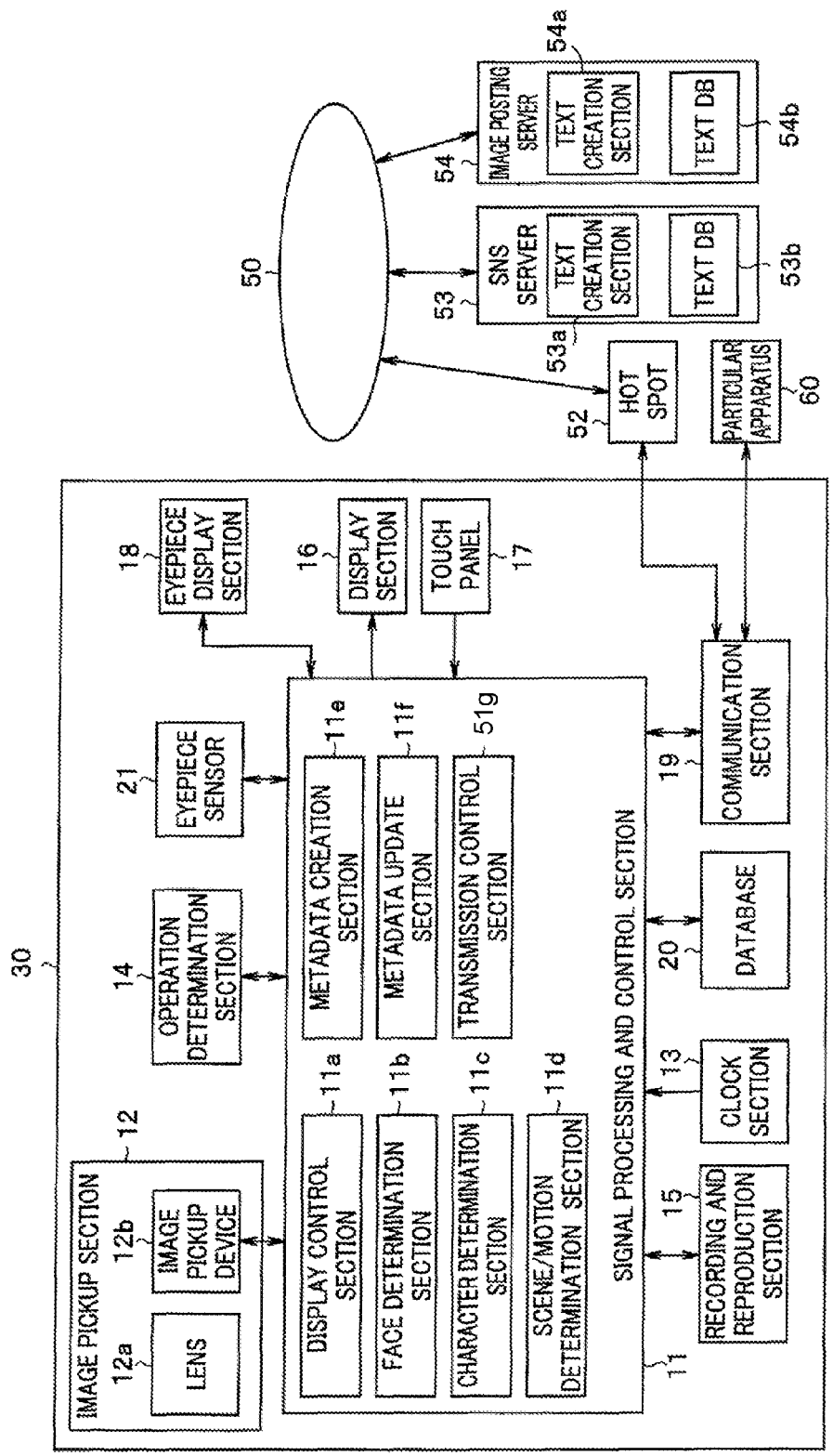
FIG. 10 is a block diagram illustrating a second embodiment of the present invention.

FIG. 10 is a block diagram illustrating a second embodiment of the present invention. In FIG. 10, same constituent elements as those in FIG. 1 are assigned same reference numerals, and a description thereof is omitted.

In the first embodiment, all the metadata is created in a photographing apparatus 10, and all the metadata to be transmitted is converted into the data description language in the photographing apparatus 10. However, it may be better to convert part or all of the data into the data description language on a server when a processing amount of the process of creating and updating the metadata is relatively large, or in consideration of a size or the like of the database required for the conversion into a text. The present embodiment takes this case into consideration.

In FIG. 10, the metadata creation section 11e performs only a metadata creating process with a relatively small processing amount, and does not perform a metadata creating process with a relatively large processing amount at the time of creating the metadata. In the transmission mode (the network sharing mode), a transmission control section 51g controls the metadata update section 11f to perform only a process of creating and updating the metadata with a relatively small processing amount, and not to perform a process of creating and updating the metadata with a relatively large processing amount. In this case, the transmission control section 51g requests a particular apparatus 60, servers 53 and 54 on a network 50, or the like to create/update the metadata, and also provides information necessary for creating/updating the metadata to the particular apparatus 60 and the servers 53 and 54.

The communication section 19 can perform communication with the particular apparatus 60 via a closed network, and transmit information specified by the transmission control section 51g to the particular apparatus 60. The communication section 19 can also perform communication with a hot spot 52 of, for example, a wireless LAN, and transmit information specified by the transmission control section 51g to the servers 53 and 54 on the network 50 via the hot spot 52.

The particular apparatus 60 is provided with a database (not shown) for converting the metadata into the data description language according to the flow, for example, shown in FIG. 7, and can thus convert the metadata into the data description language. The SNS server 53 has a text creation section 53a for generating the metadata by using the data description language. The text creation section 53a refers to a text DB (database) 53b for generating a text as the metadata, to generate the metadata described in text by using the data transmitted from a photographing apparatus 30. The image posting server 54 also has a text creation section 54a for generating the metadata by using the data description language. The text creation section 54a refers to a text DB (database) 54b for generating a text as the metadata, to generate the metadata described in text by using the data transmitted from the photographing apparatus 30.

For example, a processing amount of face recognition processing is relatively large, and a processing amount of a process of describing a name of a person in the picked-up image as the metadata is large. Thus, the transmission control section 51g transmits only a feature value of a face as the metadata. By storing information on a name corresponding to the feature value of a face in the text DBs 53b and 54b of the servers 53 and 54, the name corresponding to the feature value of a face transmitted from the photographing apparatus 30 can be generated by using the data description language in the text creation sections 53a and 54a of the servers 53 and 54.

Note that the signal processing and control section 11 can write back an image file from the particular apparatus 60 and the servers 53 and 54, and record the image file including the metadata acquired by the particular apparatus 60 and the servers 53 and 54 in the recording and reproduction section 15.

Figure 11:
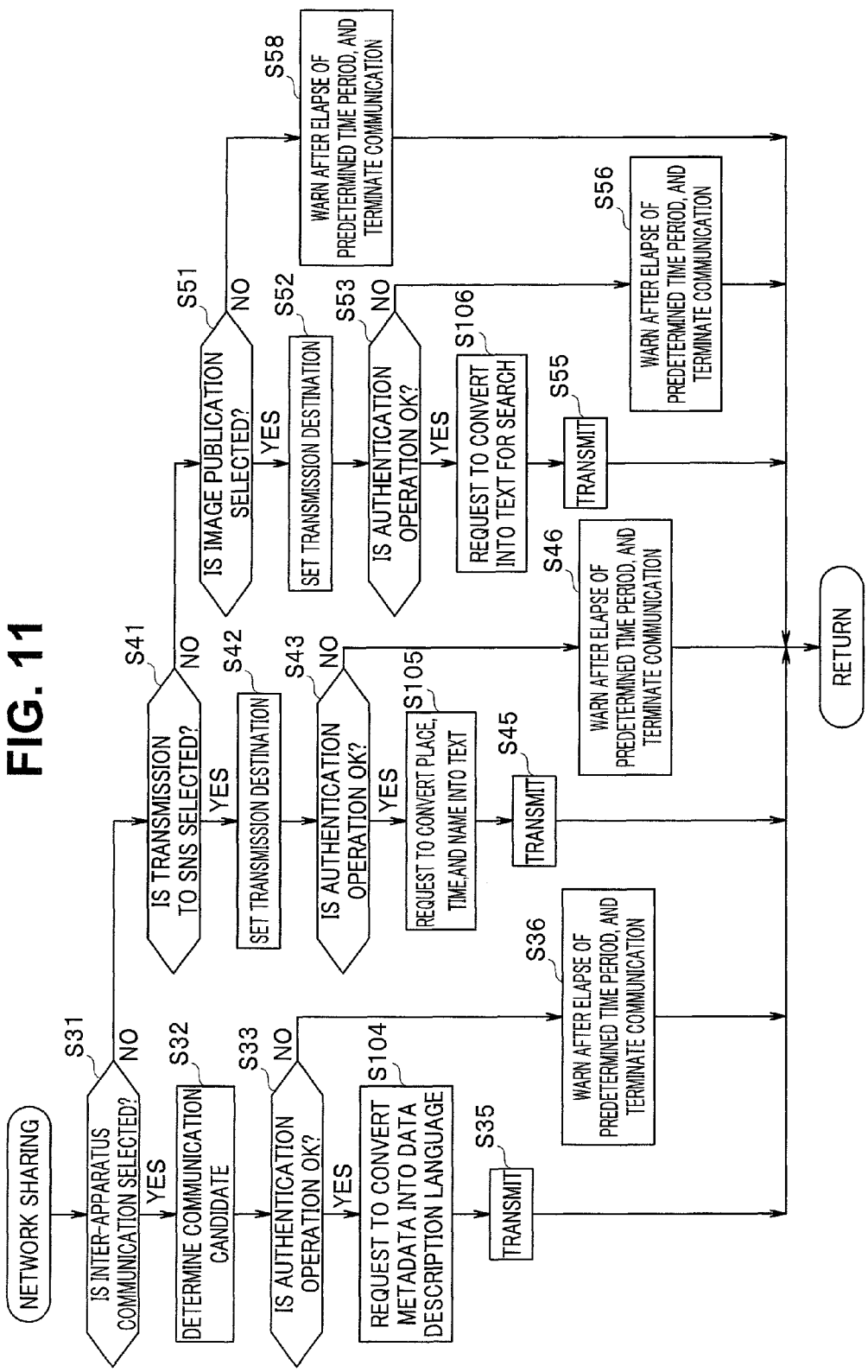
FIG. 11 is a flowchart illustrating an operation flow of a network sharing mode.
Figure 12:
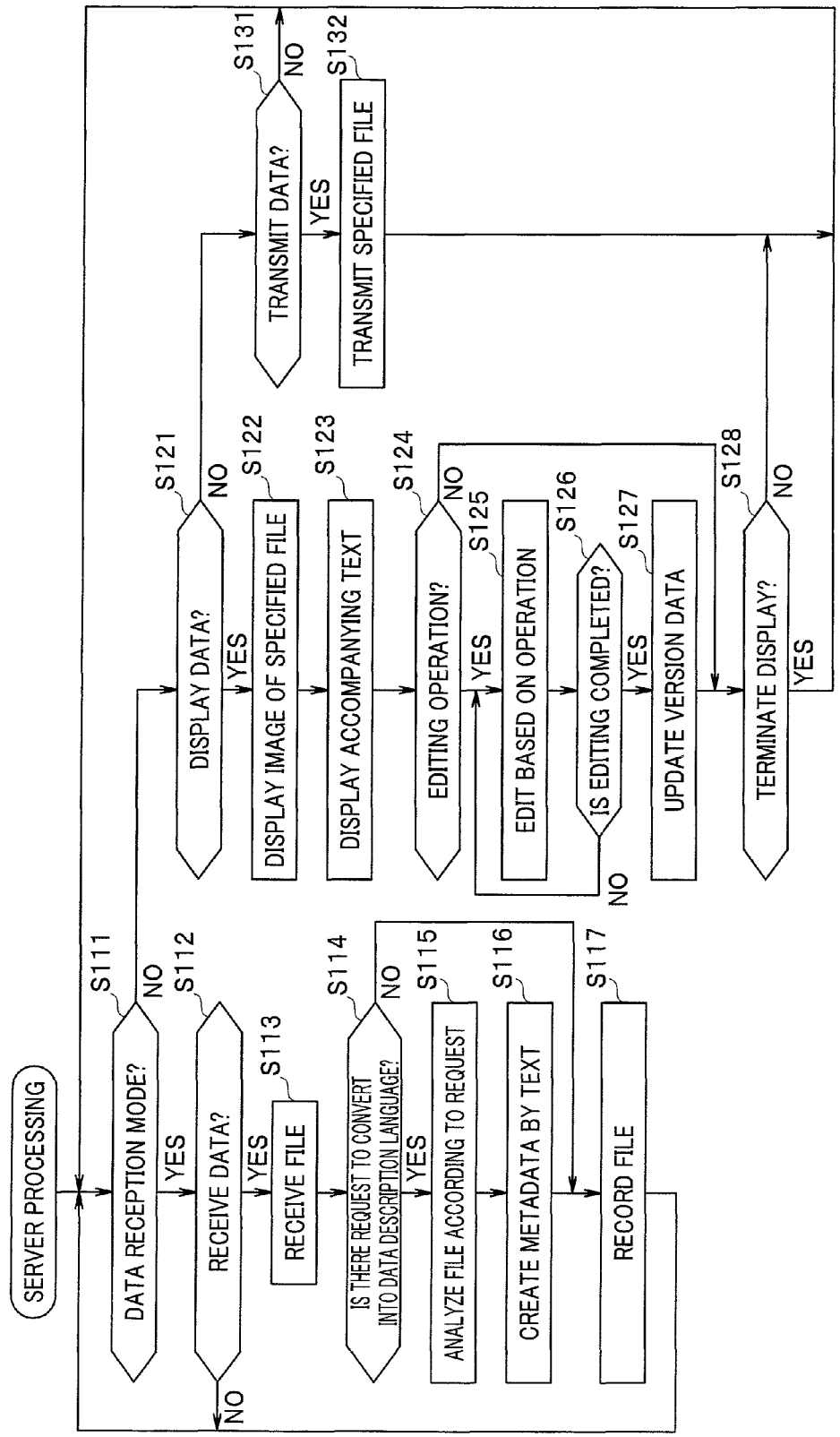
FIG. 12 is a flowchart illustrating an operation flow on a server side.

Next, an operation of the embodiment having the above configuration will be described by reference to FIGS. 11 and 12. FIG. 11 is a flowchart illustrating an operation flow of the network sharing mode. In FIG. 11, same procedure steps as those in FIG. 6 are assigned same reference numerals, and a description thereof is omitted. FIG. 12 is a flowchart illustrating an operation flow on a server side.

In the present embodiment, contents on which metadata is requested to be created are changed according to a type of a transmission destination. The transmission control section 51g classifies apparatuses as the transmission destination into three types: a particular apparatus (a server), an apparatus in a limited network (a server), and an apparatus in an open network (a server), and determines contents to be requested and contents of the metadata to be transmitted for each type.

For example, when a user selects inter-apparatus communication, the transmission control section 51g requests, for example, the particular apparatus 60 to convert the metadata into the data description language in step S104. In this case, the transmission control section 51g transmits the metadata in binary format to the particular apparatus 60 in step S35 as well as information on the request.

Also, when the user selects transmission to the SNS, the transmission control section 51g requests to convert a place, a time, and a name into a text in step S105. In this case, the transmission control section 51g transmits the metadata regarding a feature value of a face other than GPS information and date information in binary format to, for example, the server 53 in step S45 as well as information on the request.

Also, when the user selects image publication, the transmission control section 51g requests conversion into a text for search in step S106. In this case, the transmission control section 51g transmits shape and color information necessary for creating a keyword for search to, for example, the server 54 in step S55 as well as information on the request.

On the other hand, the server side including the particular apparatus operates according to the flowchart in FIG. 12. In step S111, the particular apparatus 60 and the servers 53 and 54 determine whether or not the particular apparatus 60 and the servers 53 and 54 are in a data reception mode. When the particular apparatus 60 and the servers 53 and 54 are in the data reception mode, the particular apparatus 60 and the servers 53 and 54 assume a standby state for receiving data from each apparatus that transmits the data.

When the photographing apparatus 30 selects the inter-apparatus communication and transmits the data, for example, the particular apparatus 60 receives the transmitted data. When the photographing apparatus 30 selects the transmission to the SNS and transmits the data via the network 50, for example, the server 53 receives the transmitted data. When the photographing apparatus 30 selects the image publication and transmits the data via the network 50, for example, the server 54 receives the transmitted data (step S112). In step S113, the particular apparatus 60 and the servers 53 and 54 determine whether or not there is a request for conversion into the data description language (conversion into a text) (step S114). When there is the request, the particular apparatus 60 and the servers 53 and 54 analyze a received file according to the request (step S115), create metadata in the data description language (text) (step S116), and record the generated metadata in the file (step S117).

For example, the transmission control section 51g requests the particular apparatus 60 to convert all the metadata into the data description language. The transmission control section 51g further requests conversion into a text with respect to an item on which the metadata is not created, e.g., a name obtained by face determination. The particular apparatus 60 converts the metadata into the data description language, and also performs face determination based on the feature value of a face transmitted from the photographing apparatus 30 and generates a text corresponding to a face determination result as the metadata.

The transmission control section 51g also requests the server 53 to convert a place, a time, and a name into a text. Even though the server 53 is limited, images are published to relatively large number of people. Thus, the transmission control section 51g requests conversion into a text within a range in which individuals cannot be identified with respect to a text created by using the GPS information and the date information. For example, the text creation section 53a of the server 53 refers to the text DB 53b based on the GPS information and the date information according to a flow similar to that in FIG. 8, to generate a text indicating a region or the like and a text indicating a season or the like similarly to FIG. 8. The text creation section 53a also refers to the text DB 53b to convert a name of a person in the picked-up image into a text based on the received feature value of a face. In this case, the transmission control section 51g also requests to convert, into a text, only names of, for example, a public person and an individual permitted to be published out of persons in the picked-up image.

The transmission control section 51g also requests the server 54 to make conversion into a text for search. Since the server 54 is opened to unspecified many people, the transmission control section 51g requests the conversion into a text for search within a range in which individuals cannot be identified. For example, the text creation section 54a of the server 54 converts each information into a text according to a flow similar to that in FIG. 9.

When the particular apparatus 60 and the servers 53 and 54 are not in the data reception mode, the particular apparatus 60 and the servers 53 and 54 determine whether or not data display is instructed in step S121 When the data display is instructed, the particular apparatus 60 and the servers 53 and 54 display an image of a specified file (step S122), and display a text of metadata accompanying the image (step S123).

The particular apparatus 60 and the servers 53 and 54 determine whether or not an editing operation is performed in step S124. When the editing operation is performed, editing according to the editing operation is performed (step S125) When the editing is completed (step S126), the particular apparatus 60 and the servers 53 and 54 update version data that is metadata. Steps S122 to S128 are subsequently repeated until display termination is instructed. Since the version data is also converted into the data description language, the version data can be also easily updated.

When determining that the data display is not instructed in step S121, the particular apparatus 60 and the servers 53 and 54 determine whether or not data transmission is instructed in step S131. When data transmission is instructed from an external apparatus, a specified file is transmitted to the apparatus that issues a data request (step S132). Accordingly, the image file on which the metadata is created, and the image file on which the editing is performed in the particular apparatus 60 and the servers 53 and 54 can be written back in the photographing apparatus 30.

As described above, the present embodiment has same effects as those of the first embodiment, and also has an effect in which the conversion of the metadata into the data description language can be surely performed even in processing with a relatively large processing amount by causing the external apparatus to execute the conversion into the data description language.

Note that although all the metadata is transmitted, and the server or the like is caused to create only the required metadata depending on the request in the present embodiment, only the metadata required to be converted into the data description language may be transmitted without transmitting all the metadata.

Furthermore, although the above embodiments have been described by using a digital camera as the apparatus for photographing, examples of the camera also include a digital single-lens reflex camera, a compact digital camera, a camera for moving pictures such as a video camera and a movie camera, and a camera incorporated in a mobile phone or a personal digital assist (PDA) such a smartphone.

The present invention is not directly limited to the aforementioned embodiments, and the constituent elements can be modified and embodied without departing from the scope in an execution phase. Also, various inventions can be formed by appropriately combining a plurality of constituent elements disclosed in the aforementioned embodiments. For example, some constituent elements out of all the constituent elements disclosed in the embodiments may be deleted. Moreover, the constituent elements in different embodiments may be appropriately combined.

Note that even if the operation flow is described using phrases such as "first" and "next" in the claims, the specification, and the drawings, it does not necessarily mean that the operation must be performed in this order. Also, it goes without saying that each step constituting the operation flow can be appropriately omitted with respect to a portion not affecting the nature of the invention.

What is claimed is:

1. A photographing apparatus comprising:
an image pickup section that outputs a picked-up image obtained by photographing an object;
a metadata creation section that creates metadata based on a tag format when the picked-up image is recorded;
a communication section that can transmit the picked-up image to an external apparatus;
a display section that displays the picked-up image obtained by photographing an object;
a metadata update section that causes the display section to display an operation icon to be operable by a user, and converts the metadata created by the metadata creation section into a data description language when authentication of communication with the external apparatus is performed and a mode for sharing information with a network is set by a user operation of the operation icon, wherein the metadata update section creates metadata other than the metadata created by the metadata creation section by converting the tag format to the data description language; and
a transmission control section that transmits the metadata created by the metadata update section to the external apparatus via the communication section when the picked-up image is transmitted, wherein the transmission control section transmits an image file with image data and both (1) the metadata created by the metadata creation section and (2) the metadata created by the metadata update section,
wherein the image file transmitted by the transmission control section includes the image data and both (1) the tag format metadata created by the metadata creation section and (2) the data description language metadata created by the metadata update section.

2. The photographing apparatus according to claim 1, wherein the transmission control section limits the metadata to be transmitted by the communication section according to a type of the external apparatus.

3. The photographing apparatus according to claim 1, wherein the metadata update section creates the metadata by the data description language by using a database in which a relationship between the metadata created by the metadata creation section and the data description language is described.

4. The photographing apparatus according to claim 2, wherein the metadata update section creates the metadata by the data description language by using a database in which a relationship between the metadata created by the metadata creation section and the data description language is described.

5. The photographing apparatus according to claim 1, wherein the metadata update section creates metadata other than the metadata created by the metadata creation section by the data description language.

6. The photographing apparatus according to claim 1, wherein the metadata update section creates the metadata other than the metadata created by the metadata creation section by the data description language based on at least one determination result of face determination, character determination, scene determination, and motion determination.

7. A photographing method comprising:
an image pickup step of outputting a picked-up image obtained by photographing an object;
a metadata creation step of creating metadata based on a tag format when the picked-up image is recorded;
a communication step of transmitting the picked-up image to an external apparatus;
a display step that displays the picked-up image obtained by photographing an object;
a metadata update step of causing the display of an operation icon to be user operable, and converting the metadata created in the metadata creation step into a data description language when authentication of communication with the external apparatus is performed and a mode for sharing information with a network is set by a user operation of the operation icon, wherein the metadata update step creates metadata other than the metadata created by the metadata creation step by converting the tag format to the data description language; and
a transmission control step of transmitting the metadata created in the metadata update step to the external apparatus in the communication step when the picked-up image is transmitted, wherein the transmission control step transmits an image file with image data and both (1) the metadata created by the metadata creation step and (2) the metadata created by the metadata update step, wherein the image file transmitted in the transmission control step includes the image data and both (1) the tag format metadata created by the metadata creation step and (2) the data description language metadata created by the metadata update step.

8. The photographing method according to claim 7, wherein the transmission control step limits the metadata to be transmitted in the communication step according to a type of the external apparatus.

9. A non-transitory computer-readable recording medium recording a photographing control program for causing a computer to execute:

an image pickup step of outputting a picked-up image obtained by photographing an object;

a metadata creation step of creating metadata based on a tag format when the picked-up image is recorded responsive to authentication of communication with an external apparatus;

a communication step of transmitting the picked-up image to the external apparatus;

a display step that displays the picked-up image obtained by photographing an object;

a metadata update step of causing the display of an operation icon to be user operable, and converting the metadata created in the metadata creation step into a data description language when authentication of communication with the external apparatus is performed and a mode for sharing information with a network is set by a user operation of the operation icon, wherein the metadata update step creates metadata other than the metadata created by the metadata creation step by converting the tag format to the data description language; and a transmission control step of transmitting the metadata created in the metadata update step to the external apparatus in the communication step when the picked-up image is transmitted, wherein the transmission control step transmits an image file with image data and both (1) the metadata created by the metadata creation step and (2) the metadata created by the metadata update step, wherein the image file transmitted in the transmission control step includes the image data and both (1) the tag format metadata created by the metadata creation step and (2) the data description language metadata created by the metadata update step.

10. The non-transitory computer-readable recording medium recording a photographing control program according to claim 9, wherein the transmission control step limits the metadata to be transmitted in the communication step according to a type of the external apparatus.

11. The photographing apparatus according to claim 1, wherein the authentication occurs after outputting the picked-up image by the image pickup section and after creation of the metadata by the metadata creation section.

12. The photographing apparatus according to claim 1, wherein the transmission control section controls content of the data description language metadata based on a classification of a destination to which the data description language metadata is transmitted, and wherein the classification is one of (A) particular apparatus, (B) limited network, and (C) open network.

13. The photographing apparatus according to claim 7 wherein the transmission control step controls content of the data description language metadata based on a type of a destination to which the data description language metadata is transmitted.

14. The photographing method of claim 7 wherein the transmission control step controls content of the data description language metadata based on a classification of a destination to which the data description language metadata is transmitted, and wherein the classification is one of (A) particular apparatus, (B) limited network, and (C) open network.

15. The non-transitory computer-readable recording medium recording a photographing control program according to claim 9 wherein the transmission control step controls content of the data description language metadata based on a classification of a destination to which the data description language metadata is transmitted, and wherein the classification is one of (A) particular apparatus, (B) limited network, and (C) open network.

16. The photographing apparatus of claim 1 wherein the display of the operation icon is responsive to detection of a user incline operation on the photographing apparatus.

17. The photographing method of claim 7 wherein the photographing method is performed by a photographing apparatus and wherein the display of the operation icon is responsive to detection of a user incline operation on the photographing apparatus.

18. The non-transitory computer-readable recording medium recording a photographing control program according to claim 9 wherein the photographing method is performed by a photographing apparatus and wherein the display of the operation icon is responsive to detection of a user incline operation on the photographing apparatus.

* * * * *